United States Patent [19]
Hughes

[11] Patent Number: 6,058,787
[45] Date of Patent: *May 9, 2000

[54] MASS FLOW MEASURING DEVICE

[75] Inventor: Nathaniel Hughes, Palm Springs, Calif.

[73] Assignee: Hughes Technology Group L.L.C, Palm Springs, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/879,144

[22] Filed: Jun. 19, 1997

Related U.S. Application Data

[60] Provisional application No. 60/020,179, Jun. 21, 1996.

[51] Int. Cl.[7] ........................................................ G01F 1/44
[52] U.S. Cl. ................................... 73/861.63; 73/861.52; 73/861.66
[58] Field of Search ........................... 73/861.18, 861.21, 73/861.22, 861.51, 861.52, 861.61, 861.63, 861.65, 861.66

[56] References Cited

U.S. PATENT DOCUMENTS

| | | |
|---|---|---|
| 4,481,828 | 11/1984 | Cheng . |
| 4,528,847 | 7/1985 | Halmi . |
| 4,730,500 | 3/1988 | Hughes ................................ 73/861.22 |
| 4,896,541 | 1/1990 | Hughes . |
| 4,984,470 | 1/1991 | Hayward et al. ..................... 73/861.22 |
| 5,223,763 | 6/1993 | Chang .................................. 73/861.22 |
| 5,247,838 | 9/1993 | Vander Heyden et al. . |
| 5,347,873 | 9/1994 | Vander Heyden .................... 73/861.22 |
| 5,458,005 | 10/1995 | Perelshteyn .......................... 73/861.18 |
| 5,557,051 | 9/1996 | Schalk ................................. 73/861.22 |

*Primary Examiner*—Harshad Patel
*Attorney, Agent, or Firm*—Jenkens & Gilchrist A Professional Corporation

[57] ABSTRACT

A mass flowmeter includes a hollow flow tube with a contoured longitudinal bore. Inserted into the contoured longitudinal bore are preferably four rods. The rods establish stable axial vortices within the hollow flow tube. Pressure pulses on the flow rods produced by the vortical flows are measured by pressure transducers and associated electronics then translated into an accurate measurement of mass flow. Total wide ranging flow stability and high signal output characterize this mass flowmeter as well as its ability to handle liquids, gases, and fluidized solids.

28 Claims, 5 Drawing Sheets

MASS FLOW MEASURING DEVICE

This application claims the benefit of U.S. Provisional Patent Application Ser. No. 60/020,179 filed Jun. 21, 1996.

FIELD OF THE INVENTION

The present invention relates to mass flowmeters; more particularly, the present invention relates to full flow, mass measuring flowmeters.

This invention more particularly relates to a mass flowmeter utilizing new multiple vortex formations providing unique vortex fluidic signal amplification, featuring unique flow stability for a fluid flow device, and featuring extensive rangeability precision and accuracy.

BACKGROUND

Flow regimes are normally correlated by using the dimensionless parameter Reynolds' Number.

As the term Reynolds' Number will be used throughout this specification, a brief explanation of the term Reynolds' Number follows. A Reynolds' Number is a dimensionless parameter which represents the ratio of viscous to dynamic forces involved in fluid flow and is used to relate key variables in the design of diverse fluid flow systems. The Reynolds' Number is the ratio of dynamic to viscous forces within a flowing fluid and it is of paramount importance in drag phenomena and vorticity. Specifically, the Reynolds' Number that is associated with a particular fluid flow system accounts for the effect of fluid viscosity, velocity, and density on the drag characteristics of fluid flow within the flow path of a flowing fluid through a device. A Reynolds' Number is obtained by multiplying the density of the flowing fluid by its velocity by a shape parameter (such as diameter or length). This product is then divided by the kinematic viscosity of the fluid to obtain the dimensionless Reynolds' Number. In very low gas or liquid flows, in the Hagen-Poiseuille range, the Reynolds' Number for the fluid flow system may be in the range $10^1$ to $10^2$. For very high flows in a critical turbulent range, the Reynolds' Number may be in the range $10^6$ or $10^7$, and, in between, in subsonic flow ranges.

The current invention uniquely not only operates over broad ranges, but also works equally well with liquids and gases and fluidized powders. It can also be built in a bi-directional version to measure mass flows in both directions.

The ability to traverse broad flow Reynolds' Number ranges from the viscous to the transonic range is unique among mass flowmeters. The ability to operate well at very low flows is also unique.

The invention also features modular design ability through algorithmic interrelationships allowing for easy design to meet a variety of fluids, flow ranges and state variables.

The accurate and precise measurement of the volume and/or mass of fluid flow (as distinguished from the rate of fluid flow) or the accurate and precise measurement of the quantity of a continuously moving fluid such a gas, vapor, liquid, or flowable solid through a channel or conduit with a broad range, low cost, easily usable device is a problem that has challenged scientists, engineers, and designers for many years.

Many commonly available flowmeters measure only the flow rate of the flowing fluid in terms of a standard quantity per unit time as opposed to measuring actual mass flow. Accordingly, mass flow measurement has become increasingly necessary for medical applications, and also due to costs of materials, fuel economy and process control.

There are only three types of full flow, mass measuring flowmeters presently in use. Such full flow, mass measuring flowmeters include those based on Coriolis principles, those based on magnetic principles or those employing ultrasonics.

Full flow, mass measuring flowmeters based on Coriolis principles, magnetic principles or ultrasonics generally suffer from several common drawbacks. Such drawbacks include:

(a) The inability to easily and accurately measure the mass flow of all three states of matter . . . gases, liquids and flowable solids such as powders.

(b) The high cost of such flowmeters caused by the complex highly accurate physical structure and the complex algorithms and the implementing electronics needed to obtain accurate mass flow measurements.

(c) The inability to measure flows over a broad band range of Reynolds' Numbers, necessitating a large number of flow range limited designs.

(d) Installation prerequisites required, such as flow straighteners, or pre-conditioning devices.

Excluded from the foregoing listing of full flow, mass measuring flowmeters are thermal mass flowmeters as they are not truly full flow, mass measuring flowmeters, but, rather, such thermal mass flowmeters use bypass capillary thermally heated sampling ducts in parallel with the flow stream. Such capillary thermally heated sampling ducts in thermal mass flowmeters clog easily, require periodic cleaning and create frequent recalibration problems for their users. Additionally, such thermal mass flowmeters only provide an analog of the total measurement of fluid flow.

Thermal mass flowmeters do not generally work with liquids or fluidized powder as they are essentially "by-pass" meters. Thermal mass flowmeters also impose fluid conditioning requirements, long time delays and low rangeability as well as other problems for the user.

Also, not included in the foregoing list of flowmeters, are those devices which simply measure the rate of fluid flow. Such devices include venturis, various types of precision flow nozzles, flapper vane devices, and orifice plates. In addition to not measuring mass flow, these flow rate measuring devices all have extremely significant operating range (Reynolds' Number span) limitations. Specifically, the dynamic range or the ratio of the maximum signal level ability to the experienced noise level of these flow rate measuring devices is generally limited to low dynamic ranges such as 10:1 to 20:1. In unusually expensive instruments and application limited devices somewhat higher ranges can sometimes be achieved, but these devices remain limited.

(e) Finally, another drawback of such fluid flow rate meters is usually the creation of a high pressure drop within the flowing fluid and the instability of these fluid flow rate meters over large dynamic ranges. Many of them only work on gases or liquids only.

Still further excluded from the identified group of full flow, mass flowmeters are devices called vortex shedders. Vortex shedders measure the frequency at which unstable vortices are generated by a large flow obstruction in the path of the flow, and generate unstable vortex trails. Once again, these devices measure only flow rate and typically are stable over limited dynamic ranges. Vortex shedders use an unstable pulsating vortex separation process that must be sensed by expensive transducers such as ultrasonic devices in order to obtain an accurate measurement of fluid flow rate. Vortex shedding occurs due to boundary layer separation. The mass flowmeter of the present invention described herein works with liquids, gases, fluidized solids, without the limitations of vortex shedder mass flowmeters.

One of the perceptions that has hampered the creation of a full flow, mass measuring flowmeter is the perception that fluid flow is essentially a two dimensional phenomenon. This also results from the commonly used one dimensional Bernoulli flow model used to design most of these devices. This perception has resulted in not fully appreciating the impact of the rotation or vortex action on the flowing fluid. In many devices, such as venturis, random rotation defeats the various flow rate processes. In reality, fluid flow is a complex three-dimensional phenomenon. Examples of the third dimension in fluid flow are readily observed as wing-tip vortices which appear during flight operations at the trailing edges of the wings of a fixed wing airplane or bird in flight. These processes are integral to flight itself, tornadoes, hurricanes and similar phenomenon. These commonly observed vortices exhibit a natural three dimensional rotational phenomenon but are inherently unstable. Flow in nozzles and venturis is three dimensional, but is treated conventionally as one or two dimensional. Uncontrolled rotation and boundary layer separation often destroys the operation of such flow devices.

Prior art attempts to construct three dimensional full flow mass measuring flowmeters have been beset by several problems. These problems have limited the applicability of prior art flow measurement devices to a limited dynamic range dynamic at medium to high flow measurements (high Reynolds' Numbers). In most of these measurements the flow process has been completely terminated by boundary layer separation or random rotation beyond the specified limited dynamic range.

Many of these other prior art full fluid flow devices produce very small unamplified signals. The devices using this invention feature substantial fluidic signal amplification (prior to electronic sensing), because the signals produced are many times greater than dynamic pressure ("dynamic heads"). The devices using this invention amplify the signals by generating high level fluidic signals. Further, in other prior art fluid flow devices, the signal sensing probes are often in the unstable boundary layer region. Thus, the signal is oftentimes washed out due to instability of normal fluid flow device boundary layers. This does not occur in the devices using the instant invention.

The limitations of prior art full flow, rate measuring flowmeters are due primarily to a failure to stabilize the boundary layer between the flowing fluid and the inner wall of the body or conduit which forms the flow path for the fluid and random rotation. It is well known that boundary layers are formed along the wall of the fluid conduit by the viscous friction between the flowing fluid and the inner wall of the conduit. This viscous friction provides a resistance to fluid flow and the resultant boundary layer state actually determines whether or not fluid flow continues or terminates. If the boundary layer becomes turbulent and separates from the inner wall of the fluid conduit, the fluid flow process stops. If the fluid flow process remains regular absent random rotation, then the fluid flow continues through the fluid conduit and the boundary layer remains attached to the inner wall of the fluid conduit and the process can be completed. However, stabilizing a boundary layer along the inner wall of fluid conduit is not an easy task. In most fluid flow systems, either random rotation of the flowing fluid or turbulence or the impact of fluid velocity and viscosity and resultant friction within the flowing fluid, as well as the shape of the flow conduit, determines when the boundary layer becomes unstable and separated thus ending the stable flow process. This instability or separation of the boundary layer limits the range of venturis and nozzles, as used in flow rate measurement.

In the measurement of low flows, viscous phenomena in the low flow range, which take place in standard flow devices or fluid conduits and the viscous friction forces between the flowing fluid and the inner wall of the fluid conduit, predominate the flow process. Such viscous friction forces play a dominant role in creating the potential for unstable flow random rotation or vortex shedding. This is why there are very few reliable mass or rate measuring flowmeters which can accurately measure flows in the low Reynolds' Number flow ranges. Certainly there are fewer low flow mass flow devices, and when they do work, their range ability is severely limited.

In mid-range fluid flows there is typically a region of relative quiescence or relative stability. However, even in this range the random rotation and boundary layer separation problems nonetheless continue to persist.

At high flow rates which extend into the transonic range, the boundary layers become turbulent and the flow process is interdicted because of the separation of the boundary layer from the inner wall of the fluid conduit. When such separation of the boundary layer from the inner wall of the fluid conduit occurs, fluid flow terminates. These flow-inhibiting boundary layer effects are why none of the prior art fluid flow mass flow measuring devices such as nozzles, venturis, and vortex shedders, are able to operate over a wide range of flows or Reynolds' Numbers, as can the inventions described herein.

Still another problem which affects fluid flow in a flow conduit is the oscillatory nature of fluid flow. Such oscillatory flow occurs as fluid flows approach the speed of sound or the transonic or sonic choke point and at very low flows. This is due to the formation of shockwaves within the flowing fluid, and the effective role of viscous friction.

Yet another problem which affects the stability of fluid flow is the changing nature of the controlling orifice conditions and associated flow coefficients representing a variation of fluid flow rate and state variable change in these nozzles, venturis, and similar devices. For example, in venturi-like devices and nozzles, where pressure sensing taps are located in the wall of the nozzle, both the size and shape of the boundary layer and the internal rotation of the flowing fluid within the venturi seriously affects the accuracy of the flow readings and the stability of the signals in these pressure sensing probes. Accordingly, venturi-like devices and flow nozzles are particularly subject to flow instability problems whenever they are used. Thus, venturi-like devices and nozzles have been recommended for use with flows having a Reynolds' Number greater than $10^5$, the high to moderate flow range. Other similar restrictions have been placed on other prior art fluid flow devices.

Venturis, nozzles, and orifice plates all encounter boundary layer separation problems, flow oscillation problems and random rotation problems within the flowing fluid. The problem with placing fluid pressure sensing taps near the wall of a fluid conduit is that the sensed pressure reading is affected by the unstable boundary layer within the fluid flow conduit. All these problems are overcome in the instant invention by the multiple vortex formations caused by the multiple rod system and the especially designed contours of the mass flowmeter of the instant invention.

To overcome some of the problems found in prior art flow measurement devices such as venturis, nozzles and orifices plates which are intended to be full flow meters, but are at best restricted to flow rate measurement only, various full flow mass measuring devices which utilize magnetism, Doppler sonic effects, and the minimal effects of the spin of the earth's Coriolis effect as it affects local rotational spin in a fixed body have been developed. In the Coriolis effect full flow mass measuring devices, such local rotational spins are measured by highly sensitive movement strain sensors. These more advanced and complex mass flow fluid flow measuring devices do not present the drawbacks of venturis, nozzles, and orifice plates, but rather they present significant disadvantages that are addressed above and these mass flow measuring devices are dominated by cost, limited rangeability, and complexities of installation, thus their utility is limited.

In addition to the limited range of Reynolds' Number flows which prior art flowmeters are capable of measuring, there is yet another problem. This problem is the difficulty of obtaining accurate mass measurement of gas flows because of the need to deal with the inherent compressibility of gases. Such compressibility particularly distorts measurements of mass flow due to pressure and/or temperature and therefore the density and viscosity changes which are encountered in the compressible flow measurement process. This is even a more serious problem in rate flow measurement devices as opposed to mass flow measurement devices.

Viscosity variations also dramatically affect the operation and/or accuracy of most flowmeters. Similarly, many prior art flowmeters cannot effectively measure multicomponent fluid flows such as liquids and gases together in one fluid conduit, or deal with non-Newtonian fluids. The invention described herein measures these multicomponent fluids as a combined fluid.

Because of the sensitivity of many flowmeters to turbulence, it is often necessary to insert flowmeters downstream from a flow straightener or flow conditioner to remove turbulence and rotation within the flowing fluid. In still other applications upstream turbulence is reduced by positioning flowmeters only after a long run of straight pipe.

There is also a need in the art to measure mass flows of fluidized solids such as powders or non-Newtonian fluids such as blood, and other conglomerate fluids.

In a number of applications there is a need for a bi-directional capability, specifically there is a need to have a single flowmeter measure mass fluid flow in both directions within a fluid conduit.

Finally, a need remains for a flowmeter which produces a strong, widely separated, accurate and precise signal. Such signal should be easily measured by either shielded or unshielded solid state pressure measurement transducers.

Summarizing this invention: It satisfies a need in the art for a full flow, mass measuring flowmeter which:

a) is operable over a wide range of Reynolds' Numbers;
b) can be used with compressible gases, liquids and fluidized powders;
c) is not unpredictably affected by fluid viscosities, which with additional equipment it can also measure;
d) can be used with multi-component fluids;
e) can be used without prior fluid conditioning or flow straightening devices;
f) can be used with fluidized solids or non-Newtonian fluids;
g) can be bi-directional; and
h) produces a strong, precise, accurate, clearly recognizable signal, which offers maximum accuracy and precision capability in conjunction with solid state transducers and application specific integrated circuits (ASIC's).

SUMMARY

The three dimensional, accurate, precise full flow, mass measuring flowmeter of the present invention is able to measure flow in different types of flowing substances over a wide range of Reynolds' Numbers. It has great flexibility and easily spans a dynamic range as high as 2000:1 or higher. Additionally, the flowmeter of the present invention produces a strong, easily identified, repeatable easily linearized signal.

The flowmeter of the present invention includes a hollow flow tube having especially contoured longitudinal bore. Located within the contoured longitudinal bore are identical equidistant multiple vortex generating rods which intersect the long axis of the longitudinal bore and are precisionally placed according to design algorithms and the specific design nature of the flow measurement impedance. These multiple vortex generating rods create, and by interacting, stabilize a consecutive synchronous series of vortical rotational flow regimes within the contoured longitudinal bore of the hollow flow tube. Not only do these multiple flow rods create and stabilize a concurrent synchronously rotating series of vortical flow regimes but they also provide a means for sensing the pressure pulses produced by the stable vortex activity generated by the flowing fluid by the vortex generating rods within the specially contoured longitudinal bore. These sensed high frequency pressure pulses sensed by solid state pressure sensors may then be used to provide a true reading of mass flow of the fluid being measured. Therefore, the fluid flow taking place within the hollow flow tube of the present invention is stabilized through the presence of multiple, symmetrically similar rods placed at equal distances, one from another, within the hollow flow tube. These multiple, geometrically similar rods act in concert, in terms of the mechanisms of interference aerodynamic drag, interacting with one another to produce extremely stable forces of controlled vortical rotation in the flow of any fluid media passing through the specially contoured flow tube, be it a gas, a liquid or a fluidized solid such as a powder. Such controlled vortical rotation can adequately deal with the resultant addition of other sensors, the special requirements imposed by compressibility problems associated with the pressure, density and temperature changes involved in the measurement of a compressible fluid.

It is the stable controlled multiphasic synchronous rotation of gases, liquids or flowable solids, which sets up a series of strong high frequency (having repetition rates in the 30–100 kilocycles/second range) pressure or vacuum pulses along the contoured longitudinal bore within the hollow flow tube. These strong pressure and/or vacuum pulses sensed by the flow rods may be read by a variety of different types of newly available solid state capacitive and piezo resistive high accuracy and sensitivity pressure differential and absolute pressure transducers. The readings obtained from the pressure sensitive differential transducers produce strong signals which in concert with the signals from other sensors are directly related to mass flow. In the present invention, such signals have been shown to easily produce a predictable linear-like relationship between flow pressure and flow mass. Interestingly, it has also been found that the present invention provides mass flow measurements if the flowing fluid is, a gas, a liquid or a fluidized solid such as a fluidized powder. The strong pressure or vacuum pulse signals obtained from the vortex generating flow rods correspond linearly, in all cases, with differential pressure across the mass flow device, and of a magnitude according to the actual mass flow of fluid passing through the present inventions, flow tube and vortex rod assembly.

Uniquely, the multiple rods used for creating a stable synchronous controlled rotations of fluid within the flow tube are also used to convey pressure signals which are pressure and/or vacuum pulses created by these vortices within the flowing fluid and then to the assembly of electronic sensors by passing these signals through the center of the rods. Such electronic sensors may be capacitive, piezoresistive, or oscillatory amorphous crystal sensors to further enhance the accuracy and decrypt the signals. Ancillary sensors such as absolute pressure sensors and thermistors may be used. The signals obtained from these electronic sensors are processed to produce a direct reading of mass flow. The processing of the electronic signals produced by the pressure or vacuum pulses within the flowing fluid can be accomplished with readily available ASIC or other computer componentry.

In the present invention, the flow is read three dimensionally through the mechanism of these concurrently rotating vortices. Thus, there is a recognition that all of the fluid flowing through the flowmeter of the present invention rotates in a series of such synchronous, concurrently axially rotating vortices. These vortices rotate at different speeds but they rotate in a synchronous fashion. Each of the flow rods in the zone within the hollow flow tube measures different coherent pressure and/or vacuum pulse signals.

BRIEF DESCRIPTION OF THE FIGURES

A better understanding of the mass flow measuring device of the present invention may be had by reference to the figures wherein.

OPERATIONAL THEORY

Figure 1A:
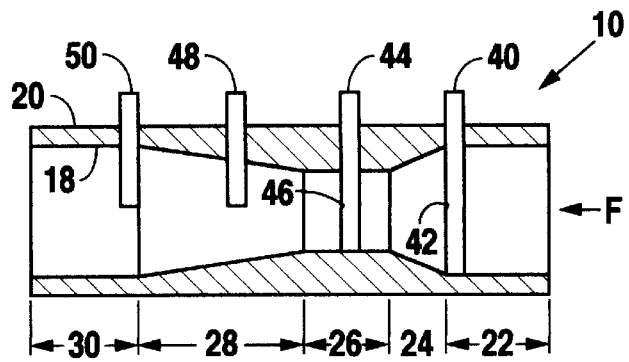
FIG. 1A is an elevational view in partial section of a four rod, mass flowmeter according to the present invention.

The full flow, mass measuring flowmeter of the present invention is based on the forced vortex rotation of a fluid, in an orderly stable manner, within an especially designed and contoured flow conduit. This orderly forced rotation produces multiple, coherent synchronous, axial vortex zones with the flowing fluid. These vortex zones rotate at different rotational velocities but they all rotate at the same time.

The primary operational basis of the three dimensional flow dynamics within the mass flowmeter of the present invention is a three part interconnective phenomena as follows:

(1) Multiple vortex generating geometries in concert with the flow tube contour geometries, generate multiple, concurrent synchronous, stable vortex regimes, either three or preferably four.

(2) The vortex zones thus generated provide stable boundary layer formations throughout the flow tube contour by virtue of the highly controlled axial vortical flows and resultant centripetal forces that are continuous through numerous flow regimes experienced by the flow measurement impedance in operation. This permits extraordinarily stable operation over wide flow regimes and the requisite changing Reynolds' Numbers experienced.

(3) Accordingly, the entire mass flow measurement tube is dominated by these interrelated synchronous, concurrent three dimensional vortical rings rotating axially. This process also produces the very highly amplified fluidic pressure pulse signals used to compute mass flow.

These axially rotating vortical rings having different angular velocities are generated within the contoured flow tubes by a series of rods or other geometries working together, and primarily based on the phenomena of interference drag, i.e. similar drag bodies in array one behind the other and preventing vortex separation or vortex shedding, but instead producing stabilized vortical formation.

These axial vortical flows and the inherent tendency of vorticity to be conserved and preserved, generate centripetal forces which support the otherwise fragile flow tube boundary layers as the flow passes the rough various flow regimes, from viscous to transonic. If, as in other devices, the boundary layer should fail, the fluid flow process is always terminated.

The use of this multiple, three dimensional vortex generation process of the present invention permits operation in flows in the Hagen-Poiseuille viscous range, in mid-range, and in high range with stable continuous operation, and a true three dimensional measurement of mass flow in any fluid. Thus, the flow rods are used to both generate predictable dominant vortex rotations within the hollow flow body and to measure the high frequency pulses produced by these predictable vortex rotations.

The signals generated by the flow rods or vortex generating bodies are stable, amplified, large, widely separated signals. Such signals provide a basis for accurate, precise, and repeatable measurements of mass flow. These signals are always large multiples of dynamic pressure (density x velocity squared). The vortices produced by the vortex generating bodies are proportional to the intensity of the dynamic pressure and mass flow rate and the geometry of the flow rods or alternate vortex generating bodies themselves. The projected frontal area of the rods, the peripheral area and the total volume of the rods and draw passages are all significant geometric parameters, effecting the signal output.

In the instant invention, mass flow controlled variation of the individual vortex rotational speeds and their intensity occurs throughout the hollow flow tube in the vicinity of the vortex generating rods. Such controlled variation of vortex rotational speed generates high output stable mass flow related measurement signals which are characterized by a marked pattern of repeatability, accuracy, and providing "linear like" signal output, which easily linearized.

In any type of rotation, the dominant forces which drive vortex rotation are the density and velocity of mass flow and the fluid viscosity. The density and velocity and viscosity of mass flow and the resultant dynamic pressure or the pressure that a fluid stream generates when it impacts or impinges on a bluff body are dominant parameters in the instant invention. The principal operative mechanism is the creation of multiple zones of stable, synchronous, concurrent axially rotating vortices. The axial rotation of these vortices is synchronized, but the rotation of each individual vortex occurs at different speeds which are sufficient to generate variant but related extremely high frequency vacuum and pressure pulses near each flow rod. These vacuum and pressure pulses are directly related to mass flow. They can also be used to provide a reading of the magnitude of the associated state variables such as viscosity and density of the fluid being measured as well.

Thus, by employing the latest state of the art differential pressure sensors, be they capacitive or piezo-resistive, an absolute sensor and thermistor, or a proprietary densimeter or tonometer, very accurate electronic signals representative of the mass flow processed through an ASIC or an array of computation chips produce a very accurate measurement of mass flow. Process terminating boundary layer separation is prevented by the centripetal forces caused by stable, controlled vortex rotation. These stable, controlled vortex rotations also isolate the mass flowmeter of the present invention from the effects of random rotation or pulsations often found in prior art flow measuring devices. The multiple vortex generating flow tubes produce an accurate encrypted mass flow signal even before the electronic sensor array is added, but the highest accuracy and precision of this invention's mass flow signal depends on this sensor's computational array.

As many as four different vortical regimes, rotating concurrently, co-exist within the full flow, mass measuring flowmeter of the present invention. The primary factor in control of the vortical regimes within the flowmeter of the present invention is achieved through the geometry of the center cylindrical section or throat of the contoured bore within the flowmeter in concert with the center rod. This throat together with either a circular or elliptical flow rod and a phased array of other rods sets up the stable, controlled vortex rotation regimes within the flowmeter.

The frontal area of the flow rod, the peripheral area of the center section or throat, and the total volume of the center section and the area ratios contour of the flow tube are all parameters which control the degree of rotation in the other zones within the flowmeter. These other zones or separate vortex zones, can produce different degrees of vorticity which are controlled from the geometry of the center section and further by the frontal area and placement of the flow rods within these zones, and the dominant stabilizing mechanism of interference drag. The other rods in the divergent section of the flowmeter provide the full three dimensional stabilization required to make the process viable.

The design of the entire contour of the interior of the flowmeter also has a marked effect on the generation and the speed of the individual vortices. As the flowmeter of the present invention does not have to contend with the negative effects of boundary layer separation and other unstable or flow terminating fluid flow characteristics, it produces a pattern of vortices which produce a reproducible and self-correcting signal for a given mass flow through a reliable array of measurable vacuum and pressure pulses, which are related to mass flow. These high frequency pulses, sensed within milliseconds of each other, are proportional to mass flow.

Applied Theory

Figure 1B:
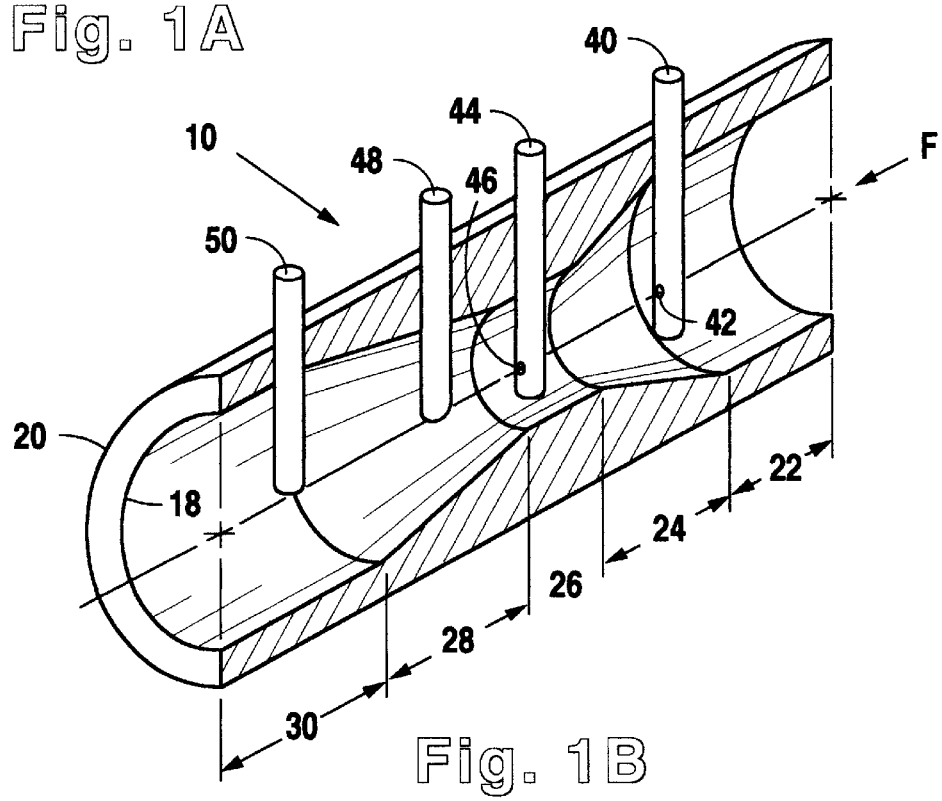
FIG. 1B is a perspective view in partial section of the mass flowmeter shown in FIG. 1A.
Figure 1C:
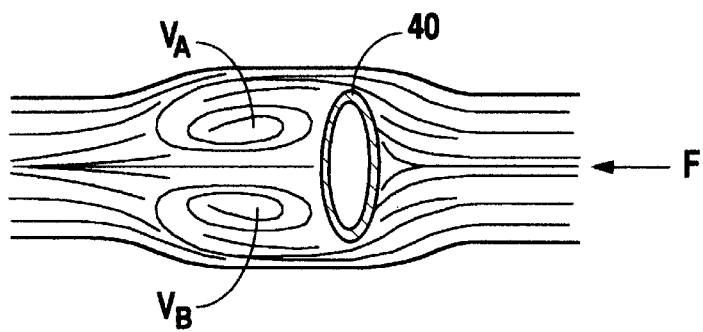
FIG. 1C is a schematic view of fluid flow demonstrating how vortices are created by the impinging of a flowing fluid on an elliptical flow rod.

By reference to the flowmeter 10 shown in FIG. 1A, it may be seen that by aligning four flow rods 40, 44, 48 and 50 within a flow tube 20 in a row in a contoured nozzle flow path 18 within the flow tube 20, stable vortex patterns, $V_A$ and $V_B$, as appear in FIG. 1C form on the downstream side of all four of these flow rods. The vortices which form on the downstream sides of the first two rods 40 and 44 produce the pressure and/or vacuum pulses which are translated into the primary mass flow signal. The outputs from the first two flow rods 40 and 44 exhibit a linear relationship with initiating pressure as measured by the difference in fluid pressure at the inlet and at the outlet. The mass flow signal when processed in the sensor/semiconductor array 316 shown in FIG. 5A which linearizes and computes the precise mass flow information encrypted in the output signal of the various flowmeter embodiments of the present invention, provides consistent signal correction thus assuring the accuracy of the process. This constant correction of the sensor/Application Specific Integrated Circuit ("ASIC") array provides for a highly accurate mass flow determination. The sensory block 316 containing the transducers shown in FIG. 5A, which receives the signals from the individual flow rods, contains ASIC's or microprocessors which compute mass flow information and relay it to appropriate output devices or read out devices. It has also been found that dividing the pulse signals obtained from the first and second flow rods by a quantity obtained from subtracting the outlet pressure from the inlet pressure, a linearized signal usable in many applications can be obtained which compensates for temperature, compressibility, and other fluid flow variables, except when high accuracy mass flow or demanding compressibility conditions requires that the measurement devices use the previously indicated sensor array.

Figure 5A:
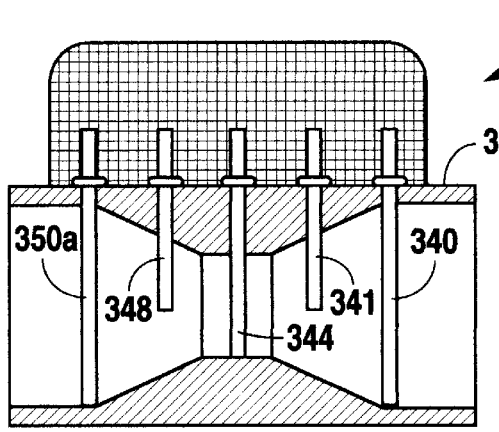
FIG. 5A is an elevational view in partial section of a five rod mass flowmeter.

A wide choice is available in the design of the various flow rods, the contours within the flow body and the various throat diameters depending on mass flow, pressure drop of the flow impedance, and desired signal output. As previously indicated with reference to FIGS. 1A and 1B, the mass flow measured signal is the signal on the first rod 40 plus the signal on the second rod 44. These signals tend to be somewhat equal but opposite in polarity thus providing a large differential signal. For some applications, a linear approximation can be obtained for some less accurate mass flow applications by dividing the signal from Rod 1 less the signal from Rod 2 by the inlet pressure minus the outlet pressure. The sum of the signals on the first rod 40 and on the second rod 44 itself is "linear-like" and/or easily linearized and is the prime variable quantity used to measure mass flow. This linearization is not required with the electronic array. The result of subtracting the flow tube outlet pressure from the flow tube inlet pressure represents a direct analog of flow velocity through the flow impedance. Therefore, the division of the pressure pulses on the flow rod less the pressure pulses on the second flow rod by the inlet pressure minus the outlet pressure represents mass flow ($KpV^2 \div KpV$=mass flow). The further signals from the first rod less the signals on the second processed by the sensor electronics array 316 of FIG. 5A provides the ultra high accuracy preferred embodiment of the instant invention.

It has been found that the third rod 48 and fourth rod 50 stabilizes vortex flow and enhances the vortex signal output from rod 40 and rod 44. The placement of the third rod 48 and the fourth rod 50 behind the center section 26 within a long divergent section 28 also produces maximum signal output. The third rod and the fourth rod 50 in the divergent section perform a number of key functions. They are:

(1) Fluid flow and vortex process stabilization due to enhanced interference drag involving two rod couplets or pairs. Further, the full flow nozzle network of vortices which result in boundary layer and flow process stabilization, and thus the result of a full three dimensional measurement of mass flow, are generated and sustained.

(2) The third and fourth rods can be used for auxiliary sensory functions such as measuring state variables like viscosity, density, temperature with auxiliary sensors and microchips.

(3) The third and fourth rods can also be used with biological and chemical sensors to make for a sophisticated sensory system involving mass flow and these other options.

Description of the Embodiments

Figure 6:
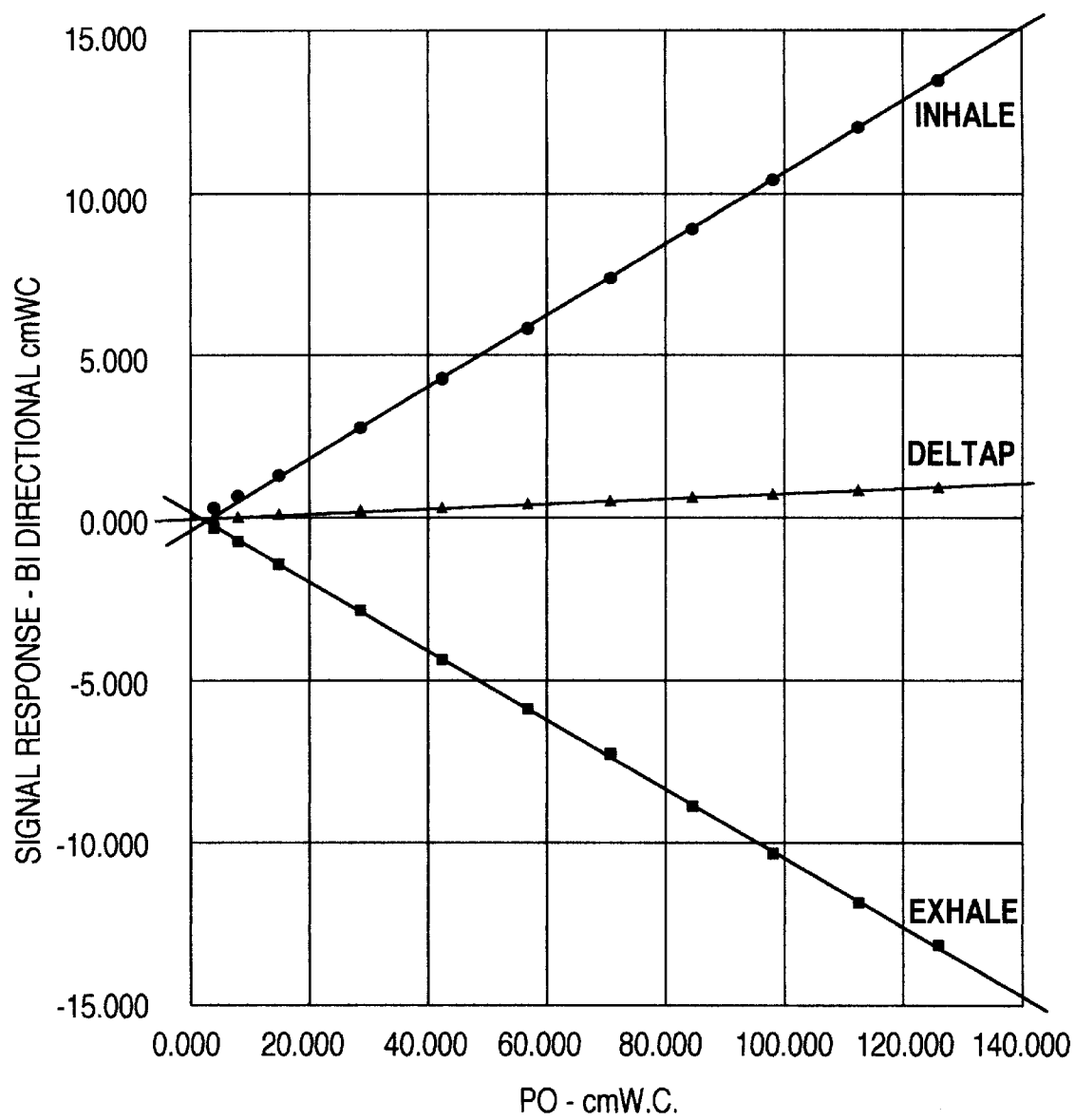
FIG. 6 is a plot showing the extraction of the "encrypted" mass flow signal from the flow meter of the present invention.

Referring again to the flowmeter 10 shown in FIG. 1A, fluid flow F enters through the cylindrical entry section 22 and passes the first rod 40. The first rod 40 traverses the entire width of the cylindrical entry section 22 within the flow tube 20. Once having passed the first flow rod 40, the fluid then passes through the tapered convergent section 24 and into the throat section 26 where it impinges upon the second flow rod 44. The first flow rod 40 and the second flow rod 44 generate somewhat equal but different polarity signals generating a large differential signal as shown in FIG. 6. It has been found that if the first flow rod 40 generates positive signals, the second flow rod 44 will generate negative signals (vacuum is after all an abstract concept related to atmospheric pressure) which are as large or larger than the signals generated by the first rod 40. The third rod 48 in the divergent section 28 and fourth rod 50 in the exit section 30 not only stabilize the vortices, but also may be used to detect information related to state variables, such as viscosity, in conjunction with the fourth rod 50. It has been found that within the flowmeter 10 there are two stabilizing couplets. Specifically, the outputs of the first rod 40 and the second rod 44 can be read for mass flow and the outputs of the third rod 48 and the fourth rod 50 can be read for state variables. It is the four rods 40, 44, 48 and 50 together which provide stabilized "linear-like" flow through synchronized axial vortex formation, through the mechanism of interference drag.

While circular rods are shown in FIGS. 1A and 1B, it will be understood that elliptical rods such as shown in FIG. 1C can be used with even greater effectiveness, or other bluff bodies can be used in a four member fashion.

A plot of the data that is produced from a flow device according to the present invention is reproduced in FIG. 6 which will be explained in greater detail below. Of particular interest is the linear nature of the relationship between measured flow and pressure difference.

Various configurations of the contoured flow passage and arrays of the cylindrical or elliptical rods used to form vortices will work equally well in that all configurations will produce a stable mass related flow signal. However, in the preferred embodiment, the rangeability, precision, accuracy and stability obtained from four circular or elliptical flow rods in a specially contoured flow body produces exceptional results.

Figure 4A:
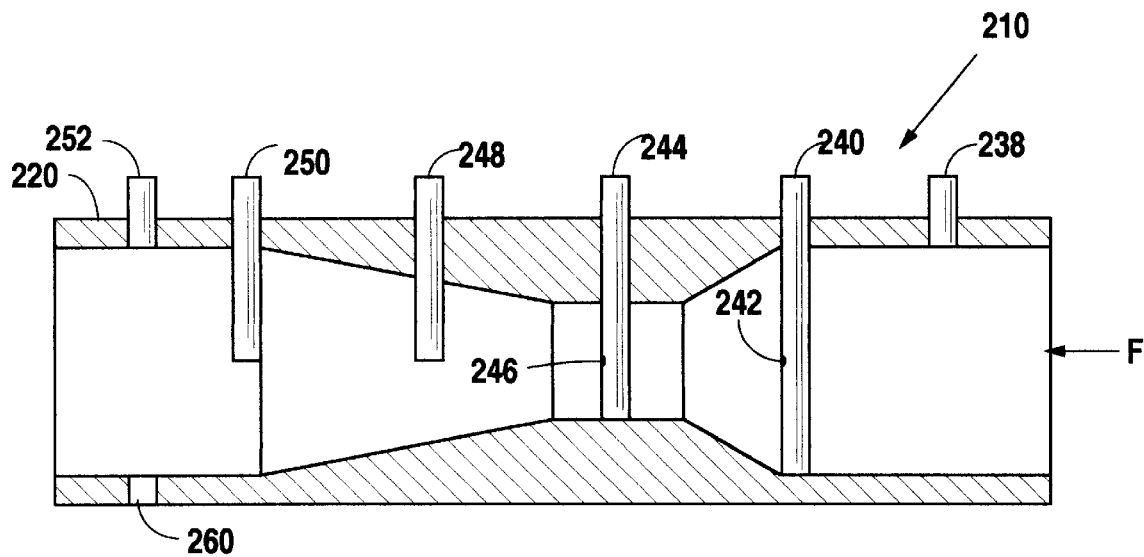
FIGS. 4A is an elevational view in partial section of an alternate embodiment of a four rod mass flowmeter with pressure sensing taps on either end.

As shown in FIGS. 4A and 1B the first flow rod 40 and the second flow rod 44 have entry ports 42 and 46 respectively which lead to a hollow center to convey pressure pulse signals generated by the stable rotating fluid flow mass to a solid state pressure sensor. Such high frequency pressure pulse signals are translated into electrical signals by one or more solid state differential or absolute pressure sensors. The generated concomitant, coincident, synchronized and axially rotating flows in different segments within the mass flowmeter not only produce stable flow without which there would be no flow process, but also produce usable pressure and vacuum pulse signals, related directly to mass flow.

The throat of the flow tube 20 generally receives a full size rod, this being the control mechanism for the entire process; however, half rods, full rods—three rods or four rods will all work. It has been found that optimum signal output, stability and rangeability occurs using four rods. The flow dynamic data of FIG. 6 shows extraordinary ¼% of reading accuracy, repeatability and precision.

Figure 2:
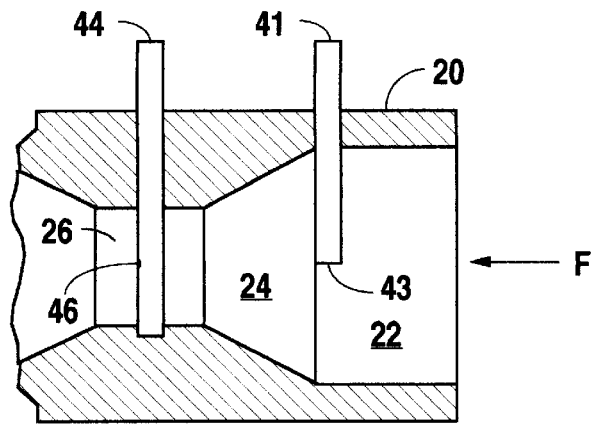
FIG. 2 is an elevational view in partial section of an alternate embodiment of the device shown in FIG. 1A and FIG. 1B.

As shown in FIG. 2, it is possible to alter the geometry of the flow rod inserted into the cylindrical entry section 22. Note that in FIG. 2, a half length flow rod 41 with an entry port 43 is used instead of a full length flow rod 40, as shown in FIGS. 1A and 1B, that extends all the way across the cylindrical entry section 22 of the flow tube 20. It has been found that a smaller signal is produced and the utility of the flowmeter over a band of flow ranges is reduced if a half length flow rod 41 is used in the cylindrical entry section 22.

Figure 3A:
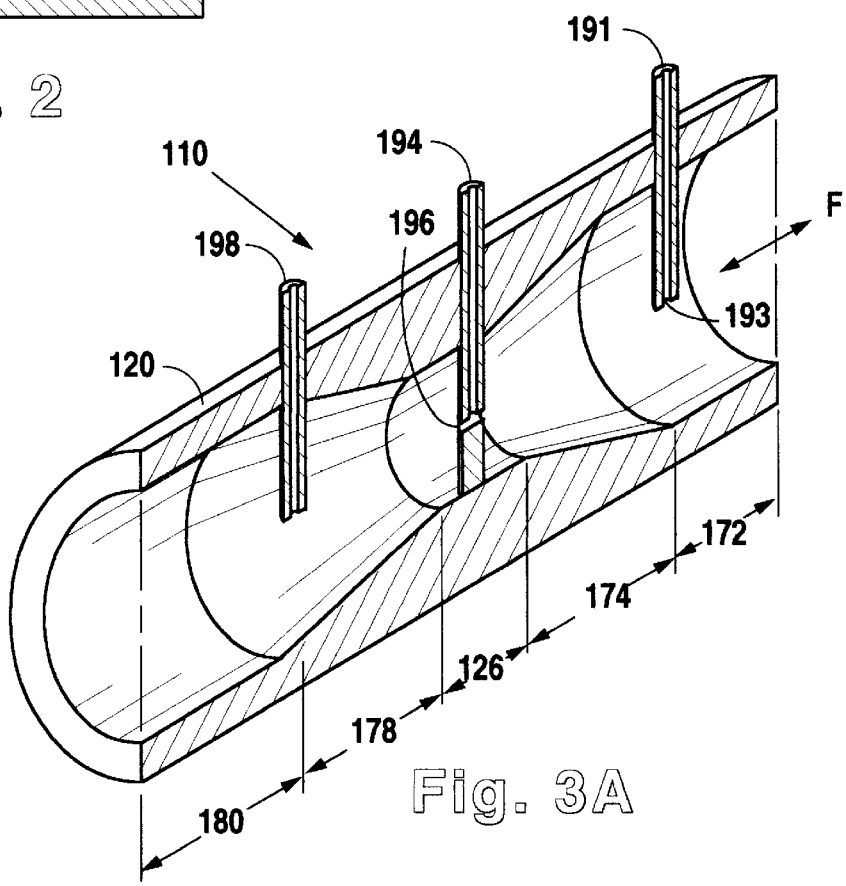
FIG. 3A is a perspective view in partial section a three rod mass flowmeter.

In FIG. 3A, a bi-directional, three rod flowmeter 110 is shown. Hollow flow rod 191 having an entry port 193 in cylindrical section 172 and hollow flow rod 198 having an entry port 197 in cylindrical section 180 are substantially identical. Flow rod 194 in the throat portion 126 between tapered sections 174 and 178 of the flow tube 120 extends all the way across the throat 126 but includes a passageway 196 which allows for pressure sensing in either direction of fluid flow. This embodiment is used for bi-directional flow measurement.

Figure 3B:
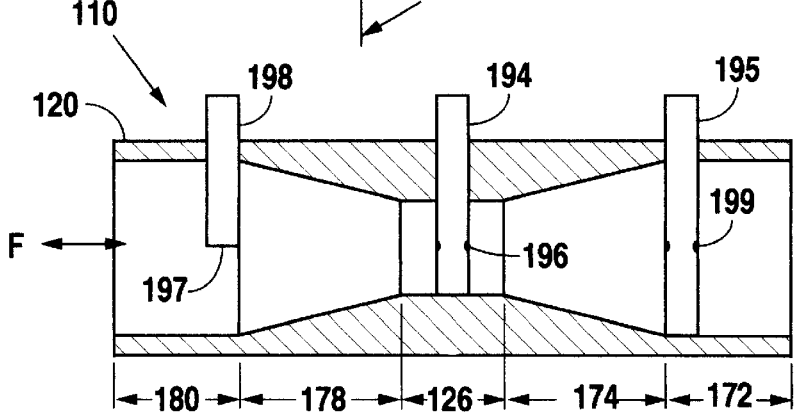
FIG. 3B is an elevational view in partial section of the three rod mass flowmeter shown in FIG. 3A.

In FIG. 3B is shown yet another variation of the flowmeter 110 in FIG. 3A. Therein a hollow flow rod 195 having a bi-directional port 199 extends all the way across the cylindrical section 172 of the flow tube 120 while only a hollow half rod 198 having a bottom port 197 is shown across cylindrical section 180. Flow rod 194 goes all the way across the throat section 126. As in FIG. 3A, the rods in FIG. 3B also have ports 196 and 199 on either side of flow rods 194 and 195 respectively, another variant for extended coverage of the invention.

Figure 4B:
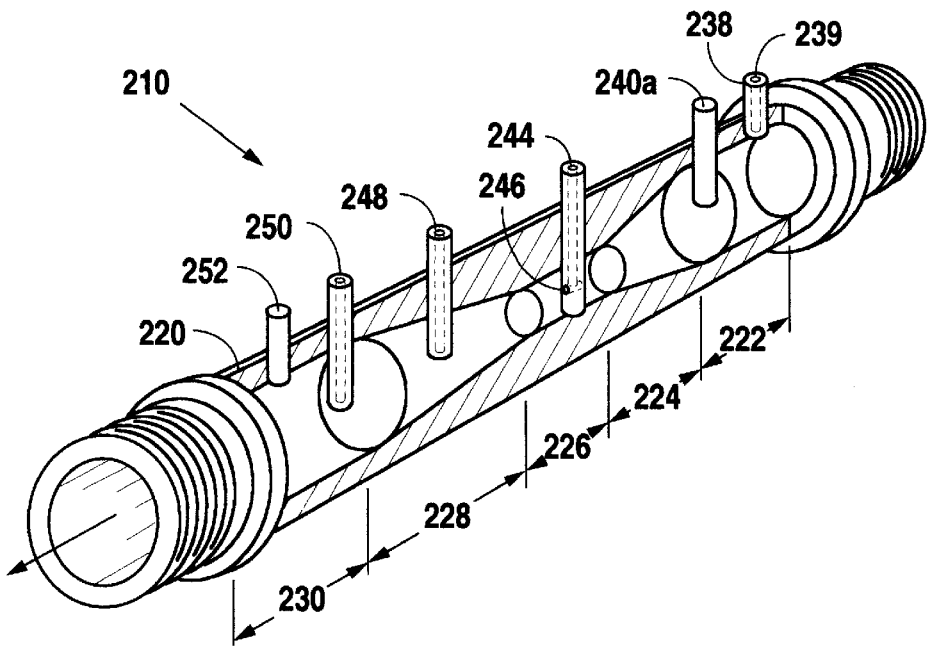
FIG. 4B is a perspective view, in partial section, of a variation of the mass flowmeter shown in FIG. 4A.

In FIGS. 4A and 4B, a four rod flowmeter 210 (the preferred embodiment including pressure drop measurement ability) is shown. However, the four rod flowmeter 210 includes hollow (see reference number 239 on tube 238, for example) sensor tubes 238 and 252 at the inlet and outlet of the flowtube 220. Those portions of flowmeter 210 having similar functions and location to the items in the previous embodiments have been given the same reference numbers as in the prior embodiment but for the numeral "2" in the hundreds place. The two sensor tubes 238 and 252 may be used to measure pressure at either end of the flowmeter 210. Note that in FIG. 4B, the first hollow flow rod 240a extends only part of the way across the cylindrical entry section 222 while in FIG. 4A, the initial flow rod 240 extends all the way across the cylindrical entry section 222. Once again, the flow rods are hollow with ports 242 and 246 existing on the back side of those flow rods 240 and 244 which extend all the way across the bore of the flow tube 220. Additionally, if desired, a thermistor and an absolute pressure sensor may be added to obtain a temperature and an absolute pressure related signal through opening 260. Also if desired, the vortex generating sensor rods 248 and 250 may be used to obtain a reading of state variables, such as pH and viscosity, and/or chemical or biological properties of the flowing fluid, with additional sensors used accordingly to the purpose desired.

Figure 5B:
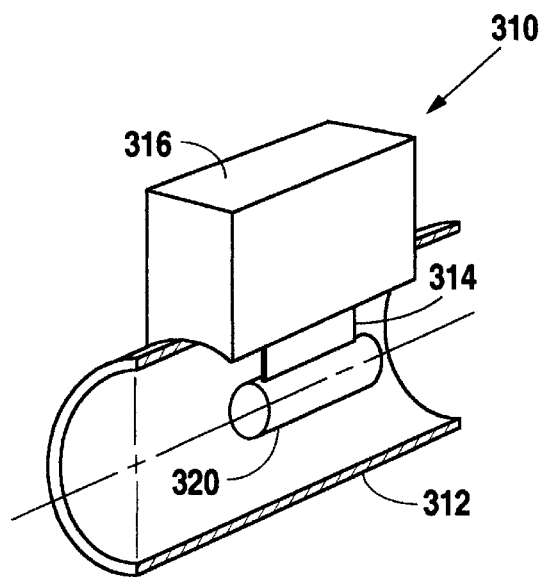
FIG. 5B is a perspective in partial section of the mass flowmeter shown in FIG. 5A mounted positioned within a pipe.
Figure 5C:
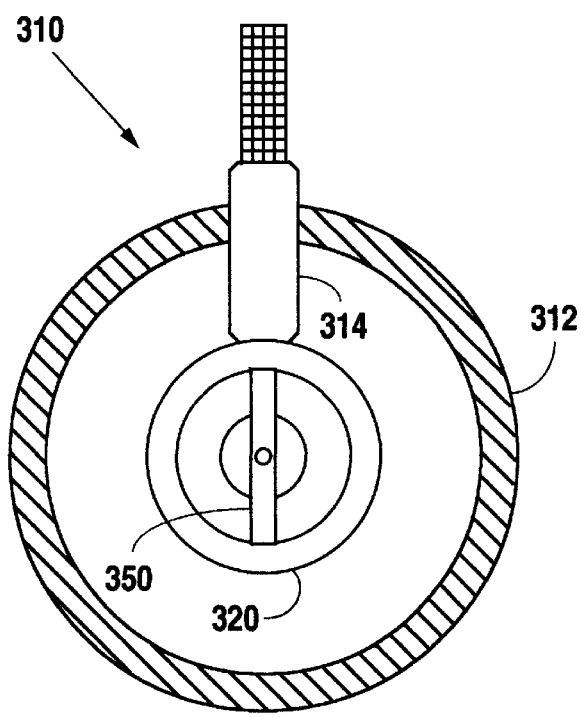
FIG. 5C is an end view of the mass flowmeter shown in FIG. 5B less the electronics package.

In FIG. 5A, FIG. 5B, and FIG. 5C, five rods 340, 341, 344, 348 and 350a in a flowtube 320 describe yet another embodiment of a flowmeter 310 according to the present invention. Such five rod flowmeters 310 may be used with insertion flowmeters which may be placed in a pipe 312 as shown in FIGS. 5B and 5C. Flowmeter 310 is mounted on a pylon 314 which is used to position the flowmeter 310 in a pipe 312 and provide a connection to the electronics package 316.

The flowmeter of the present invention has numerous applications. The most prominent application being to provide a family of disposable mass flowmeter flow tubes with re-useable electronics, for numerous medical applications. These applications include respiratory function measurement, measurement of medical fluids for intravenous flow, and flow measurement for a variety of breathing apnea machines.

The general ability to easily and economically measure mass flow also has numerous implications in the industrial application fields including critical automotive air and fuel measurement. The ability to measure ultra-low flows is important in the chemical and food flavoring industries. The effectiveness of the invention is also demonstrated when measuring the flow of fluidized powders for powder paints, or measuring the flow of fluidized fuels such as powdered coal.

As shown in FIGS. 5A, 5B, and 5C, the use of the flowmeter 310 of the present invention as an insertion flow meter in a large flow stream or in a high bypass situation is one of the important alternative embodiments. The large output signal of the flowmeter of the present invention and its exceptional sensitivity, effectively makes the flowmeter of the present invention virtually invisible to pressure drop. Thus, the flowmeter of the present invention may be used in most any application to include medical respiratory function, medical fluids monitoring, HVAC systems, heating systems, ventilating systems, air conditioning systems, hydraulic systems, and pipelines. Bypass flow ratios of 15:1 or 30:1 can be used in bypass mass flowmeters.

As shown in FIGS. 3A and 3B the flowmeter 110 of the present invention may also be used with bi-directional flow. This application is particularly important in such functions as in measuring respiratory flow, measuring the flow of diesel fuel and in certain refinery and chemical operations.

FIG. 6 graphically illustrates the data obtained from utilization of the flowmeter of the instant invention to measure the mass flow of air utilized in the breathing process of a 60 year old male. Note that "Delta P" or the difference between inlet and outlet pressures is plotted on the x-axis. Mass flow of air during inhale appears on the positive portion of the y-axis and mass flow of air during exhale appears on the negative portion of the y-axis. The pronounced linear nature of the plot of the mass flow readings obtained from dividing the sum of the readings on the flow rods by the pressure difference between the inlet and outlet is readily apparent.

Because of the capability to measure extremely low flows, it is possible that a micro version of the flowmeter of the present invention can even be used as a leak sensor, in various process control systems or to accurately measure the output of urine in medical situations. Flow sensors of even micro-machine size can be made with the current invention for extremely low flow, or for use in an array of concurrent mass flow devices in parallel.

Accordingly, the mass flowmeter of the present invention has great utility by having no moving parts, by being inexpensive to manufacture and by its ability to be made from low cost materials such a plastic, metals and ceramics and is modular in design. Because of its low cost it may be made to be disposable for applications which require disposable products as in medical application with reusable electronics isolated by biofilters. The sensor and microprocessor circuitry to obtain a mass flow reading is readily commercially available, and is not complicated with the current design available state of the art sensors and ASIC's. The output signal is easily linearized for further convenience due to the nature of the basic signal generated and the straight forward proprietary algorithms are employed to further process the data.

The modular nature of the design algorithms can accommodate any flow regime or fluid to be measured. The rangeability, accuracy, and precision of these mass flow devices are arrived at with no moving parts in a full flow contoured flow impedance featuring a modular simple design construction.

I claim:

1. A mass flow measuring device comprising:
   a hollow flow tube having a contoured longitudinal bore with a central axis;
   at least two hollow rods extending completely across said contoured longitudinal bore, said at least two hollow rods being substantially perpendicular to and extending through said central axis of said contoured longitudinal bore;
   said contoured longitudinal bore and said at least two hollow rods creating and stabilizing a concurrent series of vortical flow regimes within said contoured longitudinal bore;
   at least one additional rod extending into said contoured longitudinal bore, said at least one additional rod constructed and arranged for further stabilization of said vortical flow regimes;
   means for measuring high frequency pressure pulses conveyed through a hollow portion of said at least two hollow rods from said vortical flow regimes;
   means for converting said high frequency pressure pulse measurements into a reading of mass flow;
   whereby said at least two hollow rods which are used to establish vortical flow regimes within said contoured longitudinal bore are also used to convey said high frequency pressure pulses.

2. The mass flow measuring device as defined in claim 1 wherein said at least two hollow rods are cylindrical.

3. The mass flow measuring device as defined in claim 1 wherein said at least two hollow rods are elliptical.

4. The mass flow measuring device as defined in claim 1 wherein said contoured longitudinal bore includes an entry section, a convergent section, an elongated cylindrical throat section, a divergent section, and an exit section.

5. The mass flow measuring device as defined in claim 4 including two additional rods for vortex energy field stabilization.

6. The mass flow measuring device as defined in claim 5 wherein the first of said at least two hollow rods is placed within said entry section, the second of said at least two hollow rods is placed within said elongated cylindrical throat section, and said first and second additional rods are placed in said divergent section.

7. The mass flow measuring device as defined in claim 6 wherein said first and second hollow rods and said first and second additional rods are placed at an equal distance, one from another, along said central axis.

8. The mass flow measuring device as defined in claim 1 wherein said concurrent of vortical flow regimes within said contoured longitudinal bore are synchronous and rotate at different angular velocities.

9. The mass flow measuring device as defined in claim 1 wherein said means for measuring said high frequency pressure pulses on said at least two hollow rods is a piezo-resistive pressure transducer.

10. The mass flow measuring device as defined in claim 1 wherein said means for measuring said high frequency pressure pulses on said at least two hollow rods is a capacitive pressure transducer.

11. The mass flow measuring device as defined in claim 1 wherein said means for measuring said high frequency pressure pulses on said at least two hollow rods is an oscillatory amorphous crystal.

12. The mass flow measuring device as defined in claim 1 wherein concomitant synchronous rings of stable vortices are formed within said contoured longitudinal bore.

13. A mass flow measuring device comprising:
  a hollow flow tube having a contoured longitudinal bore with a central axis,
  said contoured longitudinal bore having an entry section followed by a convergent section, followed by an elongated cylindrical throat section, followed by a divergent section, followed by an exit section;
  a first hollow rod extending into said entry section of said contoured longitudinal bore;
  a second hollow rod extending into said elongated cylindrical throat section of said contoured longitudinal bore;
  a third rod extending into said divergent section of said contoured longitudinal bore;
  a fourth rod extending into said divergent section of said contoured longitudinal bore;
  said first hollow rod, said second hollow rod, said third rod, and said fourth rod being substantially perpendicular to and extending through said central axis of said contoured longitudinal bore;
  said contoured longitudinal bore and said four rods creating a stable and concurrent series of vortical flow regimes within said contoured longitudinal bore;
  means for measuring fluid flow pressure pulses on said first hollow and, said second hollow rods from said vortical flow regimes, said fluid flow pressure pulses being conveyed through the hollow portion of said first hollow rod and said second hollow rod;
  whereby said first, second, third and fourth rods establish vortical flow regimes which stabilize flow within said contoured longitudinal bore and enhance the provision of linear mass flow output data.

14. The mass flow measuring device as defined as claim 13 wherein said first hollow rod extends substantially halfway across said entry section.

15. The mass flow measuring device as defined in claim 13 wherein said third rod extends substantially halfway across said divergent section.

16. The mass flow measuring device as defined in claim 13 wherein said fourth rod extends substantially halfway across said exit section.

17. The mass flow measuring device as defined in claim 13 further including a first pressure sensing port upstream of said first hollow rod and a second pressure sensing port downstream of said fourth rod.

18. The mass flow measuring device as defined in claim 17 wherein the output from said means for measuring fluid flow pressure pulses on said first hollow rod, and said second, hollow rod provides a linearized, self-correcting mass flow signal.

19. The mass flow measuring device as defined in claim 18 wherein said linearized, self-correcting signal is obtained from summing fluid flow pressure pulses on said first hollow rod and said second hollow rod and dividing said sum by the difference between an inlet and outlet pressure across the flow measuring device.

20. The mass flow measuring device as defined in claim 13 wherein said first hollow rod, said second hollow rod said third, and said fourth rods create multiple synchronous, concomitant vortices acting through said contoured longitudinal bore to stabilize the boundary layers permitting operation of the mass flow measuring device with flows having a Reynolds number of substantially $10^1$ to flows having a Reynolds number of substantially is $10^7$.

21. The mass flow measuring device as defined in claim 13 wherein the dynamic range of utilization is about 1,000.

22. The mass flow measuring device as defined in claim 13 wherein the mass flow of liquids, gases, and liquid and gas mixtures is measurable.

23. The mass flow measuring device as defined in claim 13 wherein the fluid to be measured includes a fluidized solid.

24. The mass flow measuring device as defined in claim 13 wherein the fluid to be measured includes a non-Newtonian fluid.

25. The mass flow measuring device as defined in claim 13 wherein the flow is bi-directional.

26. The mass flow measuring device as defined in claim 13 wherein the device is constructed and arranged for insertion into a large flow stream.

27. The mass flow measuring device as defined in claim 13 wherein fluid flow pressure pulses formed on said first hollow rod, and said second hollow rod are connected to pressure sensors, a thermistor, and a microprocessor.

28. The mass flow measuring device as defined in claim 13 wherein said third rod and said fourth rod are also used to measure state variables such as viscosity, density and temperature.

* * * * *